Jan. 28, 1964    S. G. A. FRITZ    3,119,458
MEANS FOR PROTECTING VEHICLES AGAINST THEFT
Filed Dec. 26, 1961

INVENTOR
Salmon G. A. Fritz
By Watson, Cole, Grindle & Watson
ATTORNEYS

3,119,458
MEANS FOR PROTECTING VEHICLES
AGAINST THEFT
Salmon Gerhardus Antonie Fritz, Heidelberg, Transvaal,
Republic of South Africa, assignor to Heidelberg Patent Locks (Proprietary) Limited, Heidelberg, Transvaal Province, Republic of South Africa
Filed Dec. 26, 1961, Ser. No. 161,983
Claims priority, application Republic of South Africa
Jan. 11, 1961
10 Claims. (Cl. 180—82)

This invention relates to means for protecting motor vehicles against theft.

For the protection of motor driven vehicles against removal or theft during the absence of the driver many devices have been suggested and are in use; such devices include concealed ignition switches, alarms sensitive to vibrations, means disconnecting the steering, means, locking the handbrake on the "on" position but means have often been found to circumvent in some way any one of these devices. Another point is that most, if not all of these devices require some special action to be taken by the driver before he leaves the vehicle to put such devices in an operative condition. It frequently happens that the driver has not taken such action and consequently the setting of the protection device has been neglected with the possible result of the loss of the vehicle together with the special theft preventing device.

It is the object of this invention to provide a more reliable means for locking a vehicle.

In accordance with this invention for a motor vehicle having a key for switching on the ignition for the engine and having brakes with mechanism for applying them, there is provided a special lock for said key, mechanism combining said lock and key with transmission mechanism in the braking circuit and said combination adapted to prevent the removal of said key from the lock until the brakes are applied and the ignition switched off.

The invention further provides in a vehicle having a parking brake and fluid operated foot brake, and also a fluid operated clutch between engine and the wheels, a closed box housing said lock, also mechanism used in the operation of the parking brake and the fluid cylinders or other means for operating the foot or service brake and the clutch and mechanical means between the lock and said operating mechanisms for holding said key in the lock until the parking brake and the service brake have been applied, and the service brake and the clutch rendered inoperative and the ignition switched off.

The invention also provides for the mechanism making the parts inoperative to act to lock the steering column of the vehicle in an inoperative position and to lock the box itself against opening.

Figure 1:
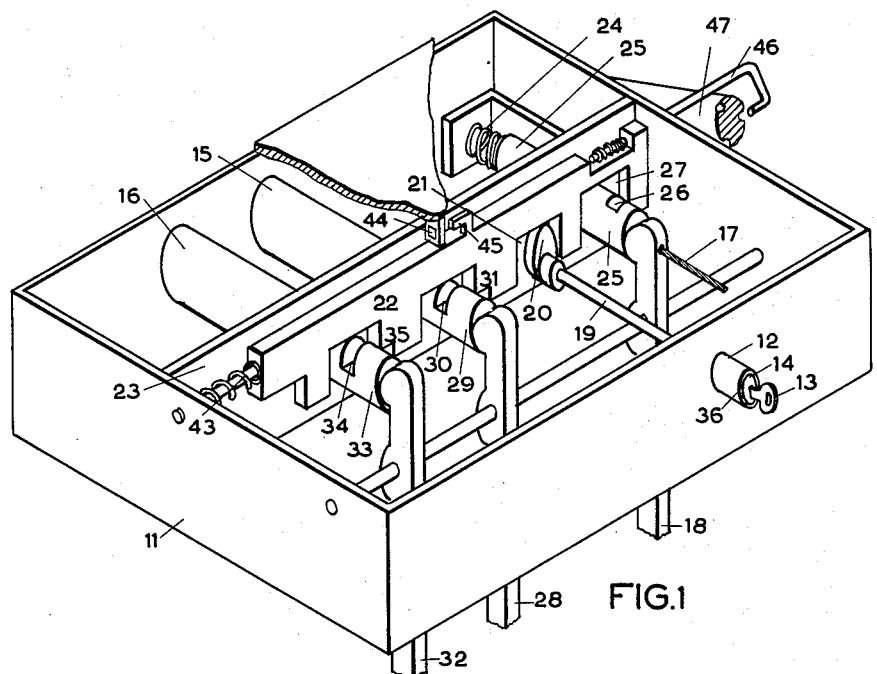
Figure 2:
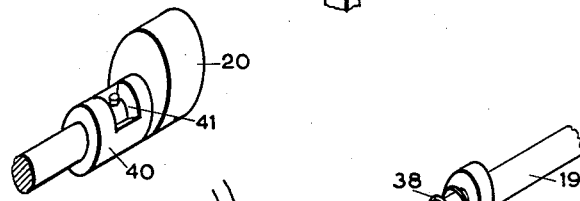
Figures 3, 4:
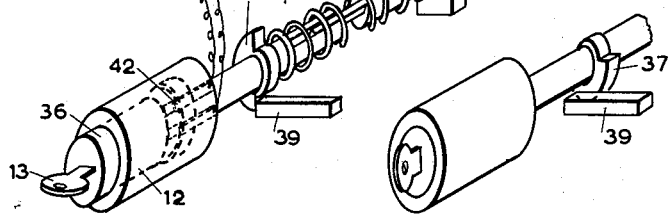

One preferred form of the invention is shown in the accompanying drawing in which:

FIG. 1 shows a box and a schematic view of mechanism housed therein for rendering a motor vehicle inoperative, said box adapted to be secured in the vehicle, FIGS. 2, 3 and 4 are details on an enlarged scale.

In the drawings the steel box 11 is conveniently mounted at the back of the dashboard of the vehicle and a tumbler cylinder lock 12 is mounted in the wall of the box 11, conveniently positioned to be reached with a key 13 by the driver.

Said key 13 is the key for the ignition system for the motor of the vehicle and the ignition switch 14 to the engine is suitably mounted in the lock 12.

In the box 11 there is also housed the master cylinder 15 for the fluid operating the foot brakes for the vehicle; the cylinder 16 for a fluid operated clutch and the parking brake plunger 25 to which cable 17 or equivalent connecting part between the manually operated parking brake lever 18 and the brake drums on the wheels of the vehicle is connected. Resisting movement of the brake lever 18 and the plunger 25 is a compression spring 24.

Connected with the lock 12 there is a member 19 rotatable with the key 13, said member 19 carrying a cam shaped member 20. The cam 20 engages a slot 21 in a sliding member 22 on a support 23. The lever 18 for operating the parking brake presses on the plunger 25, which has a slot 26 adapted to be engaged by the margin 27 of a slot in slide 22. The foot brake lever 28 has a plunger 29 with a slot 30 adapted to be engaged by the marginal part 31 of the slide 22. The lever 32 for the clutch has a plunger 33 with a similar slot 34 placed to be engaged with marginal part 35 of slide 22.

The member 19 is extensible and the lock 12 has a barrel 36 which is attached to member 19 and projects when the vehicle is being driven. A cam 37 is also attached to member 19 which is pushed to project outwardly by spring 38 (FIG. 3). In this projected position of barrel 36 the cam 37 comes in contact with a stop 39 which limits its rotation. The boss 40 of the cam 20 (FIG. 2) has an arcuate slot 41 which allows for lost-motion to take place before cam 20 is rotated by member 19 on the turning of the key 13.

The ignition switch 42 in the lock 12 (FIG. 3) makes contact when the key 13 is rotated up to the limit of the rotation limited by slot 41. Thus the key 13 can be turned sufficiently into the various required positions to make the gauges on the dashboard readable and to switch on the ignition, but the key 13 cannot be removed from lock 12.

If now the parking brake lever 18 is moved sufficiently far to put on the parking brake fully, the slot 26 will be in proper position for the part 27 of slide 22 to enter. The slide 22 is moved by the cam 20 and such movement can only take place when the barrel 36 is pressed into the lock 12 so that cam 37 is free to rotate past stop 39 on rotation of member 19 by means of the key 13. Also, it should be noted that before the slide 22 can be moved, brake lever 28 must be moved to put the service or foot brakes on, and the clutch lever 32 must be put in clutch releasing position, so that if the engine is started the vehicle will not be moved although the engine may be running. Unless the levers 32 and 28 are so positioned, the parts 31 and 35 cannot enter the slots 30 and 34 respectively.

By such rotation of the key 13, the cam 20 moves the slide 22 to the left as viewed in FIGURE 1, the wall of the notch 27 enters the slot 26 to hold the parking brake in the "on" position, and at the same time the part 35 of the slide 22 enters the slot 34 and the part 31 enters the slot 30, thus keeping the clutch lever 32 in released position and the service brake applying lever in "on" position to render the vehicle inoperative.

The turning of key 13 to this extent has opened the ignition switch and the engine is stopped and only in this position can the key 13 be removed from the lock 12.

The spring 24 presses the remote wall of the notch 26 against the edge of the opening 27 in the slide 22 and serves to frictionally hold the slide in locking position against the release urging the spring 43

To secure his car and remove his key 13 the driver has had to do several things, switch off his engine, push in the protruding barrel 36 of the lock 12, put his parking brake lever 18 on fully, also the service brake on and the clutch released, and turn his key 13 an additional 90°.

The vehicle is held inoperable and can only be released when the key 13 is placed in the lock 12 and turned. The key 13 can be turned sufficiently far to switch on the ignition and to start the engine even while the plunger 25 is held in the "on" position and the movable locking slide retained in locking position by the pressure of the compression spring 24. To release part 27 on slide 22 from slot 26 on plunger 25, parking brake pedal 18 must be pressed slightly in order to release the frictional holding pressure of the compression spring 24.

As soon as part 27 is released the compression spring 43 pushes slide 22 to release part 27 from slot 26, whereafter plungers 25, 29 and 33 are unlocked, thus rendering all the said controls again operative.

The cover of the box 11 has a depending catch 44 adapted to be engaged by the tongue 45 in the slide 22. This arrangement locks the box 11 when the vehicle is in its locked condition and the controls therein cannot be interfered with.

The driver of a vehicle equipped as above described, will, on taking his seat behind the driver's wheel, insert the key 13 in the lock 12 in the normal manner. On turning the key 13, the ignition can be switched on and the engine started and the controls released as above described.

At the end of the journey the driver will normally switch off his engine and try to remove his ignition key 13. This he cannot do until he pushes in the projecting barrel 36 on lock 12 to allow cam 37 to pass stop 39 and simultaneously applies his parking brake in such a manner that part 27 on slide 22 is moved freely into slot 26 by cam 20 moving slide 22 and allowing part 31 to move into slot 30 and part 35 into slot 34, thus rendering all the said controls again inoperative.

The box 11 can contain any additional units to be made inoperative or a combination of them as may be found necessary to meet the particular construction of the vehicle to be locked.

As an example the slide 22 may be extended by a spring loaded pin 46 which can be made to lock the steering column 47 of the vehicle, or a part connected therewith, to make the steering mechanism inoperative at the same time as the other controls.

This invention provides that only after the brakes of an engine driven vehicle have been fully applied can the controls be locked up and rendered inoperative and the ignition key be withdrawn so that the car is left protected against theft. Further the means for carrying out such protection can readily be incorporated during the manufacture of the vehicle.

What I claim as new and desire to secure by Letters Patent is:

1. An anti-theft device for a motor vehicle having actuator means for mechanism involved in the normal driving of the motor vehicle, said actuator means movable to and from positions rendering the motor vehicle operative and inoperative, and a parking brake and actuating means therefor; said device characterized by the provision of a key-actuated lock movable upon insertion of a key, a member movable into and out of contact with said actuator means to lock the latter in positions rendering the motor vehicle inoperative and to release said actuating means, means operatively connected with said key-actuated lock for moving said movable locking member into locking position upon movement of said lock, and means operatively connected with the parking brake actuating means for blocking the movement of said movable locking member into locking position unless the parking brake is applied.

2. The device as set forth in claim 1 in which means are provided for preventing the withdrawal of the key from the lock until said lock has been moved to the position where it has moved the locking member fully into such locking position.

3. The device as set forth in claim 1 in which the last named means connected with the parking brake actuator is spring pressed toward parking brake release direction into holding contact with said movable locking member during the time it is in locking position, whereby slight movement of the parking brake in applying direction is required to nullify said holding contact to permit the movement of the movable locking member to proceed under the influence of the movement of the key-actuated lock toward release position.

4. The device as set forth in claim 1 in which the theft-preventing device is enclosed in a box having a closure provided with a catch, and a tongue is provided on said movable locking member positioned to engage the catch to lock the closure upon movement of said member to locking position.

5. The device as set forth in claim 1 in which said motor vehicle is provided with a steering column and an extension is provided on said movable locking member which is adapted to enter an opening in said steering column to prevent manipulation of the latter when said movable locking member is in locking position.

6. An anti-theft device for motor vehicles having a clutch actuating member movable to and from clutch applying and released positions; a service brake actuating member movable to and from brake applying and released positions; a parking brake actuating member movable to and from parking brake releasing and applying positions; and an ignition switch and key-actuated lock movable to and from ignition-on and ignition-off positions; said device characterized by the provision of a movable locking member having means selectively adapted to interfit with and lock the action of said clutch actuating member, said service brake actuating member, and said parking brake actuating member only when said clutch actuating means is in released position and said service brake actuating means is in applied position and said parking brake actuating means is in applied position; means operatively connecting said lock with said movable locking member to move the latter to and from locking and release positions; means providing for extended movement of said key-actuated lock beyond initial ignition-on position during which further movement said key-actuated lock is adapted to move said movable lock member out of locking position, and movement in the opposite direction beyond ignition-off position to move said movable locking member into locking position.

7. The device as set forth in claim 6 in which resilient means is provided for urging a part of said parking brake actuating means into holding contact with said movable locking member and in the release direction of said parking brake operating means, whereby slight movement of the parking brake actuating means in the applying direction is necessary to enable the key-actuated lock to move said movable locking member into release position.

8. The device as set forth in claim 6 in which means are provided for preventing the removal of the key from the key-actuated lock until said lock has been moved out of ignition-on position and in the direction for movement of the movable locking member to locking position, and until said movable locking member has been fully moved to such locking position.

9. The device as set forth in claim 8 in which the aforesaid movements of the key-actuated lock are rotary, and stop means is provided for preventing the key-actuated lock from moving to actuate the locking member until the key is inserted and the lock moved a predetermined distance in an axial direction.

10. The device as set forth in claim 6 in which said movable locking member is a sliding plate notched to accommodate parts of said clutch, service brake, and parking brake actuating mechanism, each of said actuating mechanisms having notches into which the margins of the notches of the plate may enter, in which there is provided a cam disposed within another notch in said movable locking member to slide it to and from locking position, and in which there is provided a lost motion connection between said key-actuated lock and said cam to permit the lock to control both the ignition and the movement of the locking member in appropriate timed relationship.

References Cited in the file of this patent

UNITED STATES PATENTS

| | | |
|---|---|---|
| 1,730,526 | Pancoast | Oct. 8, 1929 |
| 1,839,142 | Cullen | Dec. 29, 1931 |
| 2,637,789 | Critchfield et al. | May 5, 1953 |

FOREIGN PATENTS

| | | |
|---|---|---|
| 922,873 | France | Feb. 10, 1947 |